Patented May 13, 1930

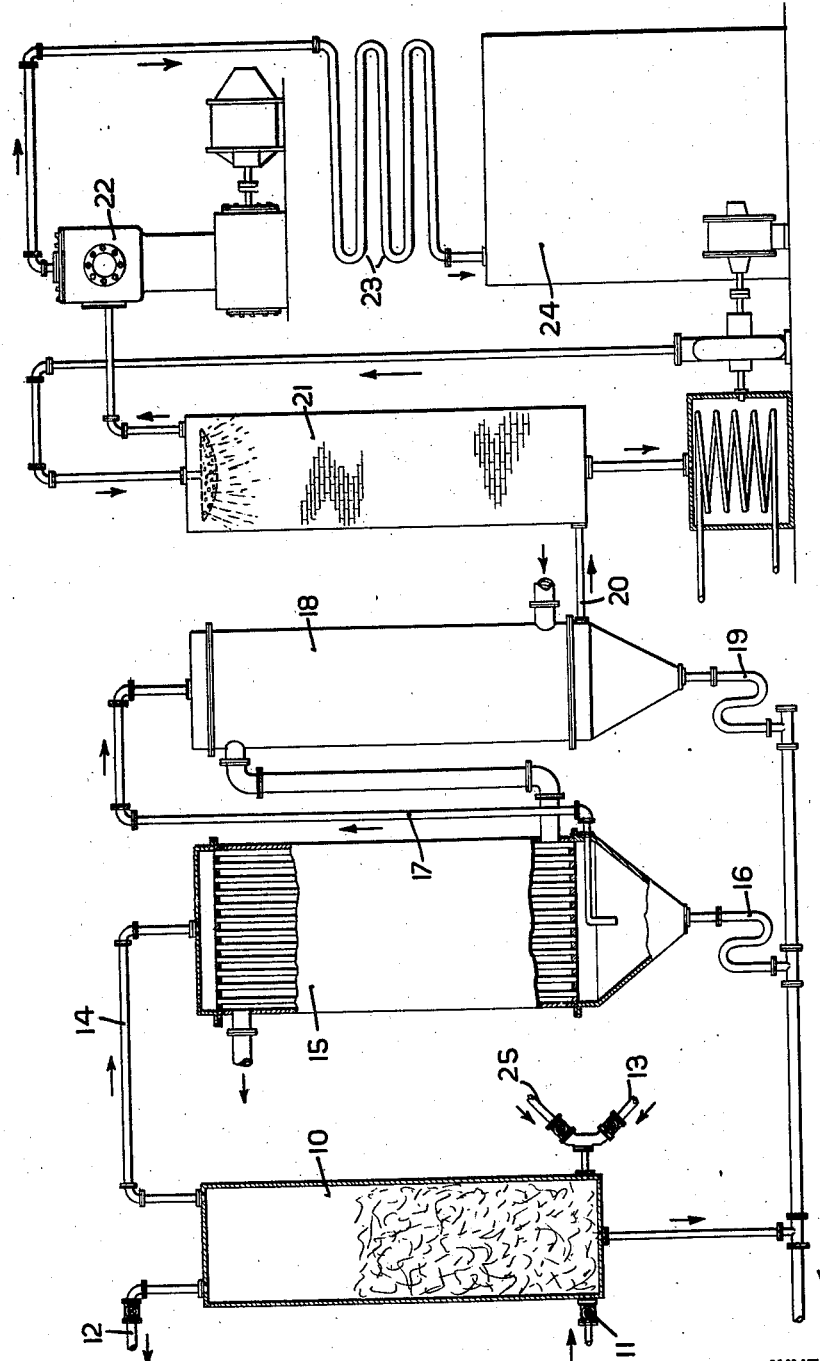

1,758,398

UNITED STATES PATENT OFFICE

RUDOLPH LEONARD HASCHE, OF ELIZABETH, NEW JERSEY, ASSIGNOR TO AMERICAN SMELTING AND REFINING COMPANY, OF NEW YORK, N. Y., A CORPORATION OF NEW JERSEY

SEPARATION AND RECOVERY OF GASES

Application filed August 17, 1927. Serial No. 213,550.

This invention relates to the separation and recovery of gases, and more particularly, to the separation of a gas which in the liquid state has a vapor pressure greater than atmospheric at room temperature from a gas mixture. The process may be applied to a mixture of gases containing sulphur dioxide, nitrogen dioxide, carbon dioxide, chlorine, ammonia and various vapors and is especially applicable to the recovery of sulphur dioxide from smelter gases.

In accordance with the present invention, the desired gas is selectively adsorbed from the gas mixture in which it is contained by means of a solid adsorbent thru which the gas mixture is passed. The adsorbent such, for example, as silica gel, activated charcoal iron oxide or alumina will readily adsorb certain gases from the gas mixtures at comparatively low temperatures and will again give off those gases at higher temperatures. The process therefore, comprises passing the gas mixture through the adsorbent material at a given low temperature such, for example, as room temperature and subsequently releasing the adsorbed gas by raising the temperature through a suitable application of heat whereby the gas is driven off and may be recovered.

It has heretofore been extremely difficult to accurately control the temperature of a solid adsorbent throughout the mass thereof since the adsorbents are comparatively poor conductors of heat. Consequently, if an external application of heat is relied upon, the outer portions of the adsorbent material will be raised to a much higher temperature than the internal parts thereof and the liberation of gases will be non-uniform.

In accordance with the present invention, the adsorbent material is heated uniformly by the introduction of a highly heated gas or vapor such as steam which is passed into the pores and interstices of the mass and transfers heat to the various portions thereof. Steam, due to its high heating capacity, is capable of effectively causing the adsorbent material to liberate the adsorbed gas although various other substances may be used, if desired. The liberated gas may be recovered by passing the same together with the exhaust steam into a suitable condenser where the steam is condensed and separated from the gas. The latter substance may then be passed to a suitable compressor, cooled and recovered in the liquid form.

Although the process may be applied to various types of substances, it will be described hereinafter in connection with the recovery of sulphur dioxide from smelter gases with the use of silica gel as an adsorbent. This particular application however, is not intended as a limitation on the process but has been selected solely in order to simplify the description.

The invention further consists in the new and novel features of operation and the new and original arrangements and combinations of steps in the process hereinafter described and more particularly set forth in the claims.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which the figure is a diagrammatic representation of one form of the apparatus which may be utilized in carrying on this process.

In the following description and in the claims the various steps in the process and the details comprising the invention will be identified by specific names for convenience but they are intended to be as generic in their application as the art will permit.

Considering the process more in detail, the gases should preferably be cooled and freed from dust and fume before being passed through the adsorbent material. This may be accomplished in any desired manner as by partially cooling the gases by the aid of cooling coils and then passing said gases through beds of coke whereby the greater part of the dust and fume will be removed. The gases may then be passed through water scrubbers wherein they are cooled to a low temperature such as, for example, 25° C.

The above mentioned adsorbents have a stronger affinity for sulphur dioxide than for the other constituents of the smelter gas mixture, for example, nitrogen and oxygen. The cooled, dust-free gases may therefore be passed through said adsorbents and the sulphur dioxide will be adsorbed thereby whereas the various other gaseous constituents will be unaffected and will escape into the atmosphere.

When the adsorbent material has become sufficiently saturated by sulphur dioxide, the gas mixture should be cut off from that particular bed of material and applied to a fresh quantity thereof until the adsorbed gases have been driven off and the substance again placed in condition for further adsorption, as will be hereinafter set forth. The cut off point may be determined by the escape of sulphur dioxide along with the exhaust gases after passing through the adsorbent material.

Steam may then be admitted directly into the saturated adsorbent and will raise the temperature thereof sufficiently to cause a substantial portion of the adsorbed gas to be driven off.

These gases together with the exhaust steam may then be passed through a condenser, preferably of the water-cooled type, wherein the bulk of the water vapor is condensed. The sulphur dioxide may then be scrubbed by passing through a wash tower containing strong sulphuric acid, compressed and cooled, and run into storage tanks as will be hereinafter set forth more in detail.

Referring to the drawings, the gases which have been cleaned and scrubbed and cooled to approximately 25° C., as above mentioned, are passed through pipes 11 into adsorber 10 containing silica gel, activated charcoal, alumina iron oxide or the like. The gases pass up through the adsorber and gas stripped of sulphur dioxide is vented into the atmosphere through pipe 12 at the top of the adsorber. The adsorption is continued until some of the sulphur dioxide escapes thru said pipe unadsorbed, then the rich gases are shunted into a second adsorber (not shown) where the adsorption part of the cycle is continued as just described. A higher adsorption is obtained if some suitable means is provided to cool the material during the adsorption, since there is considerable heat generated in the process. Cold water pipes (not shown) running through the adsorbent bed may be emplyed for this purpose.

Steam is then introduced through pipe 13 directly into the adsorbent material of the first adsorber and a very rapid evolution of sulphur dioxide occurs. The mixture of steam and sulphur dioxide passes through pipe 14 into the top of the water-cooled primary condenser 15 where most of the steam is condensed. The condensate contains some dissolved sulphur dioxide; which is returned to the scrubber, through pipe 16.

By maintaining the primary condenser at a suitably high temperature the amount of sulphur dioxide dissolved in the condensate will be kept at a small figure. It is apparent, therefore, that the smaller the amount of steam used in driving the sulphur dioxide from the adsorbent, the greater will be efficiency of the primary adsorber in the recovery of sulphur dioxide.

The sulphur dioxide passes from the bottom of the primary condenser through pipe 17 into a secondary condenser 18 where the gas is cooled to approximately the temperature of the entering cooling water, and deprived of more water vapor. The condensate in this condenser will be less in volume than in the primary condenser and it is returned to the system through pipe 19.

The gas from the secondary condenser, still containing a small amount of water vapor passes through pipe 20 into the tower 21 where it is dried with sulphuric acid. It is then passed to the compressor 22 and through the refrigerating coils 23 wherein it is liquefied. The liquid sulphur dioxide then flows by gravity into the storage tank 24.

This completes the adsorbing and desorbing part of the cycle. By desorbing, is meant the process of driving the adsorbed sulphur dioxide from the adsorbent. The second adsorber, (not shown) is now connected with the steam supply and the process of desorption is repeated in the same manner as just described with the first adsorber.

The first adsorber is cooled by a current of compressed air, the air entering through pipe 25 and leaving through pipe 12. The vaporization of the water left in the adsorbent bed and in other parts of the adsorber, effected by the air blast, produces rapid cooling of the adsorber and its contents. When cool, the adsorber is ready for another adsorption. To make the cycle continuous three adsorbers are necessary; one of which will be adsorbing, a second desorbing and the third cooling.

This process provides for the cheap and efficient recovery of sulphur dioxide from various gases by adsorbing the same in a mass of silica gel and desorbing by a suitable application of heat. The desorbed gases are passed through primary and secondary condensers wherein the steam is condensed and removed. Substantially dry gases are then scrubbed with sulphuric acid which removes the remainder of the moisture, then are cooled and compressed.

A hot vapor, such as steam, not only serves to transfer heat evenly to the various portions of the adsorbent material but, due to its high heat capacity, the temperature of the mass is rapidly raised to a point where a substantial amount of the adsorbed gases are driven off. The process therefore, provides for the efficient utilization of the adsorbent material with the application of a minimum amount of external heat.

Although certain novel features of the invention have been shown and described and are pointed out in the annexed claims, it will be understood that various omissions, substitutions and changes in the several steps of the process and in its operation and in the form and details of the apparatus illustrated may be made by those skilled in the art without departing from the spirit of the invention.

What is claimed is:

1. The method of separating and recovering sulphur dioxide gas from smelter gases, which comprises passing said gas, free from dust and fume, through silica gel, expelling sulphur dioxide from said gel by passing steam therethrough, separating the sulphur dioxide from said steam by passing through a primary condenser maintained at a sufficiently high temperature to condense the major portion of said steam without adsorbing excessive quantities of sulphur dioxide, and passing the sulphur dioxide through a second condenser whereby the gas is further cooled and its moisture content lowered, said second condenser being maintained at a temperature below that of said primary condenser.

2. The method of separating and recovering sulphur dioxide gas from smelter gases, which comprises passing said gases free from dust and fume through silica gel, expelling sulphur dioxide from said gel by passing steam therethrough, separating the liberated sulphur dioxide from said steam by passing the same through a primary condenser maintained at a sufficiently high temperature to condense the major portion of said steam without adsorbing excessive quantities of sulphur dioxide, passing the sulphur dioxide through a second condenser whereby the gas is further cooled and its moisture content lowered, said second condenser being maintained at a temperature below that of said primary condenser, and removing the remainder of the moisture from said gas by passing the same over sulphuric acid.

3. The method of separating and recovering a gas which in the liquid state has a vapor pressure greater than atmospheric at room temperature from gas mixture, which comprises passing said gases, free from dust and fume, through silica gel, expelling said gas from said gel by passing steam therethrough, separating the liberated gas from said steam by passing the same through a primary condenser maintained at a sufficiently high temperature to condense the major portion of said steam without adsorbing excessive quantities of said gas, and passing the gas through a second condenser for further cooling and lowering its moisture content, said second condenser being maintained at a temperature below that of said primary condenser.

4. The method of separating and recovering sulphur dioxide gas from smelter gases, which comprises passing said gases free from dust and fume through a solid adsorbent, expelling said sulphur dioxide therefrom by passing steam therethrough, separating the sulphur dioxide from said steam by passing through a primary condenser maintained at a sufficiently high temperature to condense the major portion of said steam without adsorbing excessive quantities of sulphur dioxide, and passing the sulphur dioxide through a second condenser whereby the gas is further cooled and its moisture content lowered, said second condenser being maintained at a temperature below that of said primary condenser.

5. The method of separating and recovering a gas which in the liquid state has a vapor pressure greater than atmospheric at room temperature from gas mixture, which comprises passing said gas through a solid adsorbent, expelling said gas from said adsorbent by passing steam therethrough, separating sulphur dioxide from said steam by passing through a primary condenser maintained at a sufficiently high temperature to condense the major portion of said steam without adsorbing excessive quantities of sulphur dioxide, and passing the sulphur dioxide through a second condenser whereby the gas is further cooled and its moisture content lowered, said second condenser being maintained at a temperature below that of said primary condenser.

In testimony whereof I have hereunto set my hand.

RUDOLPH LEONARD HASCHE.